United States Patent
Guo et al.

(10) Patent No.: US 9,832,461 B2
(45) Date of Patent: Nov. 28, 2017

(54) METHOD AND APPARATUS OF DEBLOCKING FILTER WITH SIMPLIFIED BOUNDARY STRENGTH DECISION

(71) Applicant: HFI INNOVATION INC., Zhubei, Hsinchu County (TW)

(72) Inventors: Xun Guo, Beijing (CN); Jicheng An, Beijing (CN); Chih-Wei Hsu, Taipei (TW); Yu-Wen Huang, Taipei (TW); Shaw-Min Lei, Hsinchu County (TW)

(73) Assignee: HFI INNOVATION INC., Zhubei (TW)

( * ) Notice: Subject to any disclaimer, the term of this patent is extended or adjusted under 35 U.S.C. 154(b) by 510 days.

(21) Appl. No.: 14/239,531

(22) PCT Filed: Oct. 29, 2012

(86) PCT No.: PCT/CN2012/083676
§ 371 (c)(1),
(2) Date: Feb. 18, 2014

(87) PCT Pub. No.: WO2013/064047
PCT Pub. Date: May 10, 2013

(65) Prior Publication Data
US 2014/0169478 A1 Jun. 19, 2014

(30) Foreign Application Priority Data
Oct. 31, 2011 (CN) .......................... 2011 1 0337674

(51) Int. Cl.
*H04N 7/12* (2006.01)
*H04N 11/02* (2006.01)
(Continued)

(52) U.S. Cl.
CPC ..... *H04N 19/00909* (2013.01); *H04N 19/117* (2014.11); *H04N 19/159* (2014.11);
(Continued)

(58) Field of Classification Search
CPC ................................................. H04N 19/00909
(Continued)

(56) References Cited

U.S. PATENT DOCUMENTS

| | | | |
|---|---|---|---|
| 2003/0053541 A1* | 3/2003 | Sun | H04N 19/51 375/240.16 |
| 2006/0171472 A1* | 8/2006 | Sun | H04N 19/51 375/240.25 |

(Continued)

FOREIGN PATENT DOCUMENTS

| | | |
|---|---|---|
| CN | 101106713 A | 1/2008 |
| CN | 101449476 | 6/2009 |

(Continued)

OTHER PUBLICATIONS

Sullivan, G.J., et al.; "Overview of the High Efficiency Video Coding;" IEEE; 2012; pp. 1-19.
(Continued)

*Primary Examiner* — Gims Philippe
*Assistant Examiner* — Amir Shahnami
(74) *Attorney, Agent, or Firm* — Wolf, Greenfield & Sacks, P.C.

(57) ABSTRACT

A method and apparatus for deblocking of reconstructed video in a video coding system are disclosed. Embodiments according to the present invention determine boundary strength between two blocks without checking whether the block boundary is a coding unit (CU) boundary. In one embodiment according to the present invention, the method comprises determining whether any of the two blocks is Intra coded. If any of the two blocks is Intra coded, the boundary strength is assigned a first value. Otherwise, additional decision processing is performed to determine the boundary strength. In another embodiment, said determining the boundary strength for the block boundary comprises
(Continued)

determining whether the block boundary is a TU boundary and whether any of the two blocks contains coefficients. In yet another embodiment, said determining the boundary strength for the block boundary comprises determining whether the two blocks have different reference pictures or different motion vectors.

2 Claims, 3 Drawing Sheets

(51) Int. Cl.
    *H04N 19/86*    (2014.01)
    *H04N 19/159*   (2014.01)
    *H04N 19/176*   (2014.01)
    *H04N 19/117*   (2014.01)
    *H04N 19/82*    (2014.01)

(52) U.S. Cl.
    CPC .......... *H04N 19/176* (2014.11); *H04N 19/82* (2014.11); *H04N 19/86* (2014.11)

(58) Field of Classification Search
    USPC ........................................... 375/240
    See application file for complete search history.

(56) References Cited

U.S. PATENT DOCUMENTS

| | | |
|---|---|---|
| 2006/0268985 A1 | 11/2006 | Liang et al. |
| 2011/0116549 A1 | 5/2011 | Sun |
| 2011/0170610 A1* | 7/2011 | Min ............... H04N 19/139 375/240.24 |
| 2011/0222607 A1 | 9/2011 | An et al. |
| 2013/0034169 A1* | 2/2013 | Sadafale ........... H04N 19/176 375/240.24 |
| 2016/0314816 A1 | 10/2016 | van Stam et al. |

FOREIGN PATENT DOCUMENTS

| | | |
|---|---|---|
| CN | 101472175 A | 7/2009 |
| EP | 1 408 697 | 4/2004 |
| EP | 2 750 385 | 7/2014 |

OTHER PUBLICATIONS

An, J., et al.; "Improved Deblocking Filter;" Joint Collaborative Team on Video Coding (JCT-VC) of ITU-T SG16 WP3 and ISO/IEC JTC1/SC29/WG11; Mar. 2011; pp. 1-8.

McCann, K., et al.; "Samsung and BBC response to Call for Proposals on Video Compression Technology;" 2010; pp. 1-36

Davies, T.; "BBC's Response to the Call for Proposals on Video Compression Technology;" Joint Collaborative Team on Video Coding (JCT-VC) of ITU-T SG16 WP3 and ISO/IEC JTC1/SC29/WG11; Apr. 2010; pp. 1-31.

Yang, J., et al.; "Intra Prediction Mode Based Improved Deblocking Filter;" IEEE International Conference on Consumer Electronics; 2011; pp. 1-2.

Lou, J., et al.; "H.264 Deblocking speedup," IEEE Transactions on Circuits and Systems for Video Technology; vol. 19; No. 8; Aug. 2009; pp. 1178-1182.

Chen, H., et al.; "An Effective Method of Deblocking Filter for H.264AVC;" IEEE; 2007; 1092-1095.

* cited by examiner

METHOD AND APPARATUS OF DEBLOCKING FILTER WITH SIMPLIFIED BOUNDARY STRENGTH DECISION

CROSS REFERENCE TO RELATED APPLICATIONS

The present application is a National Stage Entry of PCT Patent Application No. PCT/CN2012/083676, filed Oct. 29, 2012, entitled "Method of Deblocking Filter". PCT Patent Application No. PCT/CN2012/083676 claims priority to Chinese Patent Application No. 201110337674.7, filed Oct. 31, 2011, entitled "Method of Deblocking Filter". The PCT Patent Applications is hereby incorporated by reference in its entirety.

TECHNICAL FIELD

The present invention relates to video coding. In particular, the present invention relates to the deblocking filter with simplified boundary strength decision.

BACKGROUND

Motion compensated transform coding has been widely adopted in various coding standards, where block transform is applied to motion-compensated residues. The motion compensated inter-frame coding system also uses intra-frame mode periodically or adaptively. During the coding process, transform coefficients are quantized in order to reduce bitrate and consequently artifacts are introduced. The artifacts are more visible at boundaries around transform blocks. In order to alleviate the coding artifacts, a technique called deblocking has been developed which applies filtering across block boundaries adaptively. The deblocking technique is also called deblocking filter in the field of video coding.

The deblocking process applies filters to boundary pixels and the filter coefficients are related to boundary strength of associated boundary. The deblocking filter process performs a series of testing to determine the boundary strength of a selected boundary. According to the derived boundary strength, filter ON/OFF decision is made. Furthermore, when an ON decision is made, filter coefficients are selected according to boundary strength. However, the conventional filter decision process contains redundancy, which unnecessarily consumes system computational resource. Furthermore, the redundancy may also degrade system performance in terms of compression efficiency. It is desirable to remove the redundancy in order to conserve system resources and/or to improve system performance.

SUMMARY

A method and apparatus for deblocking of reconstructed video in a video coding system are disclosed. Embodiments according to the present invention determine boundary strength between two blocks without checking whether the block boundary is a coding unit (CU) boundary. In one embodiment according to the present invention, the method comprises determining whether any of the two blocks is Intra coded. If any of the two blocks is Intra coded, the boundary strength is assigned a first value. Otherwise, additional decision processing is performed to determine the boundary strength. The additional decision processing comprises first testing and second testing; wherein the boundary strength is assigned a second value if a result associated with the first testing or the second testing is affirmative, and the boundary strength is assigned a third value otherwise. The first testing corresponds to determining whether the block boundary is a TU boundary and whether any of the two blocks contains coefficients. The second testing corresponds to determining whether the two blocks have different reference pictures or different motion vectors.

In another embodiment of the present invention, said determining the boundary strength for the block boundary comprises determining whether the block boundary is a TU boundary and whether any of the two blocks contains coefficients. In yet another embodiment of the present invention, said determining the boundary strength for the block boundary comprises determining whether the two blocks have different reference pictures or different motion vectors.

DETAILED DESCRIPTION

For digital video compression, motion compensated inter-frame coding is an effective compression technique and has been widely adopted in various coding standards, such as MPEG-1/2/4 and H.261/H.263/H.264/AVC. In a motion compensated system, motion estimation/compensation and subsequent compression is often performed on a block by block basis. During compression process, coding noises may arise due to lossy operations such as quantization. The coding artifacts may become noticeable in the reconstructed video data, especially at or near block boundaries of block-based transform. In order to alleviate the visibility of coding artifacts, a technique called deblocking has been used in newer coding systems such as H.264/AVC and the High Efficiency Video Coding (HEVC) system being developed. Furthermore, HEVC adopts a separate unit for block-based prediction, named prediction unit (PU), which may be different from the transform unit (TU). Consequently, the boundaries of PUs may not be aligned with the boundaries of TUs. In HEVC, the deblocking process is based on an 8×8 block for both luma and chroma components.

Figure 1:
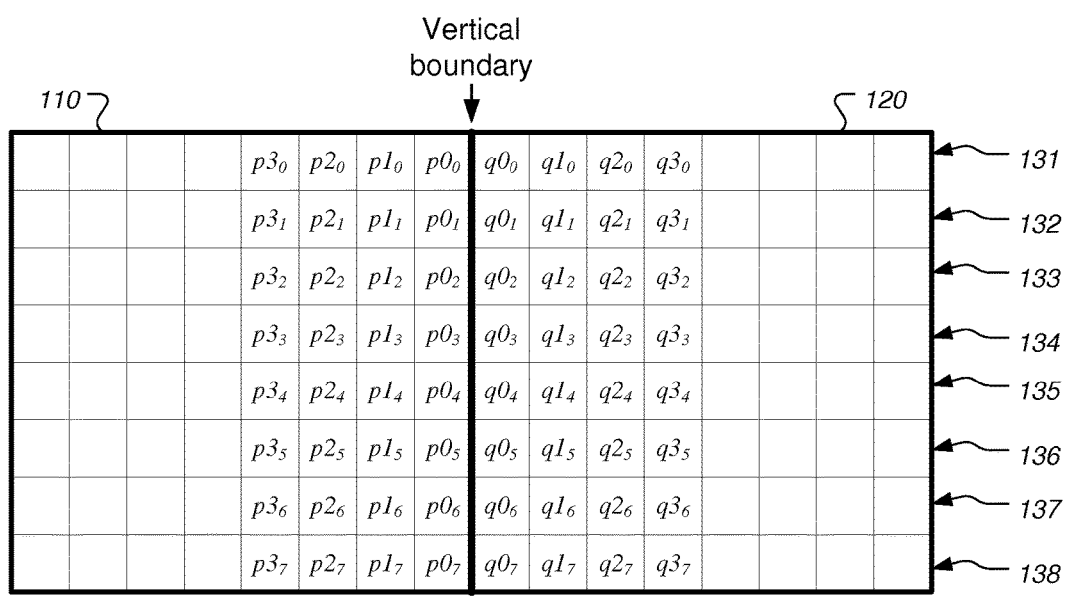
FIG. 1 illustrates an exemplary vertical block boundary between two neighboring blocks and pixel lines across the boundary.

FIG. 1 shows an example of a vertical boundary to be filtered between block P 110 and block Q 120 shown as thick boxes in FIG. 1, where each block consists of 8×8 pixels. Eight pixel lines associated with the two neighboring blocks are labeled from 131 through 138 as shown in FIG. 1. Four pixels on each side of the vertical boundary are labeled as $(p3_i, p2_i, p1_i, p0_i, q0_i, q1_i, q2_i, q3_i)$, where i is the index for the pixel lines and i=0, . . . , 7. Pixels immediately next to the block boundary, i.e., $p0_i$ and $q0_i$, are named first boundary pixels. Similarly, $p1_i$ and $q1_i$ are named second boundary pixels, $p2_i$ and $q2_i$ are named third boundary pixels and $p3_i$ and $q3_i$ are named fourth boundary pixels. In this example, block P 110 and block Q 120 corresponds to two PUs or TUs. The drawing in FIG. 1 can be rotated clockwise by 90 degrees to illustrate the case for a horizontal block boundary. The deblocking process includes steps of determining filter ON/OFF, determining filter strength and applying deblocking filter. The filter ON/OFF decision checks if the transition at the boundary is a natural edge or is caused by coding artifacts. If it is a natural edge, the filter is turned OFF to preserve the sharpness of the picture associated with the respective boundary. Otherwise, the deblocking filter is turned ON to reduce the artifacts. The filter ON/OFF decision is first performed for all block boundaries of the respective picture area to be filtered. If a boundary is to be filtered, filter strength decision, i.e., selecting a strong or weak filter, will be determined. Subsequently, a deblocking filter with the determined filter strength is applied to the boundary to be filtered. The deblocking process is termed as deblocking for convenience in this disclosure. The deblocking process is also called deblocking filter (DF) in the field of video coding. The filter used for deblocking is also called deblocking filter. Therefore, the term deblocking filter may refer to the deblocking process or the filter used for deblocking depending on the context.

In order to keep the computational complexity low, the filter ON/OFF decision according to conventional HEVC is determined based on only two pixel lines. For example, in HM-3.0, line 2 and line 5 are used. Edge activity measure, d is computed based on pixels in lines 2 and 5:

$$d=|p2_2-2p1_2+p0_2|+|q2_2-2q1_2+q0_2|+|p2_5-2p1_5+p0_5|+|q2_5-2q1_5+q0_5|. \quad (1)$$

If the Edge activity measure d is smaller than a pre-defined threshold β, the corresponding block boundary will be filtered. The pre-defined threshold, β is related to quantization parameter (QP). If a block boundary is determined to be filtered, the weak/strong filter decision is then performed line by line according to the conditions:

$$d<\beta>>2, \quad (2)$$

$$|p3_i-p0_i|+|q3_i-q0_i|<\beta>>3, \quad (3)$$

and $$|p0_i-q0_i|<5 \cdot tc+1, \quad (4)$$

where tc is another pre-defined threshold related to QP, which is used to avoid over-filtering pixels. If all three conditions above are satisfied, a strong filer is selected. Otherwise a weak filter is selected. The deblocking filter operation is also related to the pre-defined threshold tc.

Figure 2:
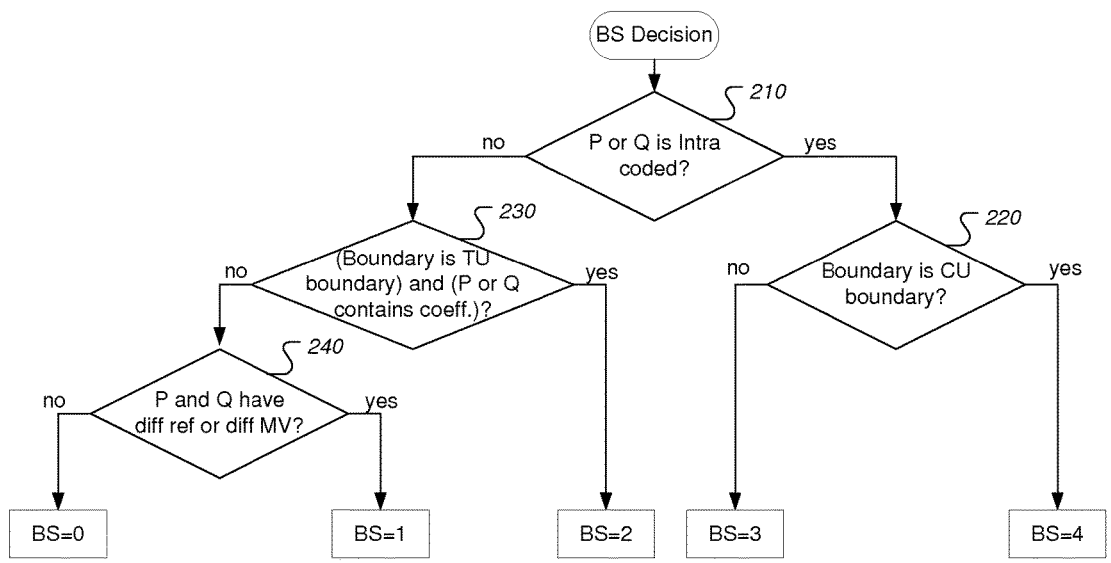
FIG. 2 illustrates an exemplary decision tree for determining boundary strength according to a conventional method in emerging High Efficiency Video Coding (HEVC).

The deblocking filter for chroma components is similar to that for the luma component, but it is only used for intra block boundaries. The boundary strength (BS) derivation according to HEVC Test Model version 3.0 (HM-3.0) is illustrated in FIG. 2. A decision regarding whether block P or block Q is Intra coded is made in step 210. If the test result is "yes", the process goes to step 220. Otherwise, it goes to step 230. In step 220, the decision regarding whether the block boundary is a CU boundary is made. If the block boundary is a CU boundary, the boundary strength value is set to 4 (BS=4). Otherwise BS=3. In step 230, a decision regarding whether "(Boundary is TU boundary) and (P or Q contains coefficients)" is made. If the result is "yes", the boundary strength value is set to 2 (BS=2). Otherwise the process goes to step 240. In step 240, a decision regarding whether blocks P and Q have different reference pictures or different motion vectors is made. If the test result is "yes", the boundary strength value is set to 1 (BS=1). Otherwise BS=0. The usage of boundary strength according to HEVC Test Model version 3.0 (HM-3.0) is shown in Table 1.

TABLE 1

| BS value | Usage of BS |
| --- | --- |
| 0 | Filtering off |
| 1 | Luma filtering on & TC_offset = 0 |
| 2 | Luma filtering on & TC_offset = 0 (Same as BS = 1) |
| 3 | Luma filtering on & Chroma filtering on & TC_offset = 2 |
| 4 | Luma filtering on & Chroma filtering on & TC_offset = 2 (Same as BS = 3) |

In Table 1, TC_offset corresponds to tc in equation (4). The settings of filter ON/OFF control and tc are the same for BS=1 and BS=2. Similarly, the settings of filter ON/OFF control and tc are the same for BS=3 and BS=4. In other words, from the point of view of filter control (ON/OFF and weak/strong) and filter operations, there is no need to differentiate between BS=1 and BS=2. Therefore, one of these two BS values is redundant. Also there is no need to differentiate between BS=3 and BS=4. Accordingly, embodiment of the present invention removes the redundancy in BS decision.

Figure 3:
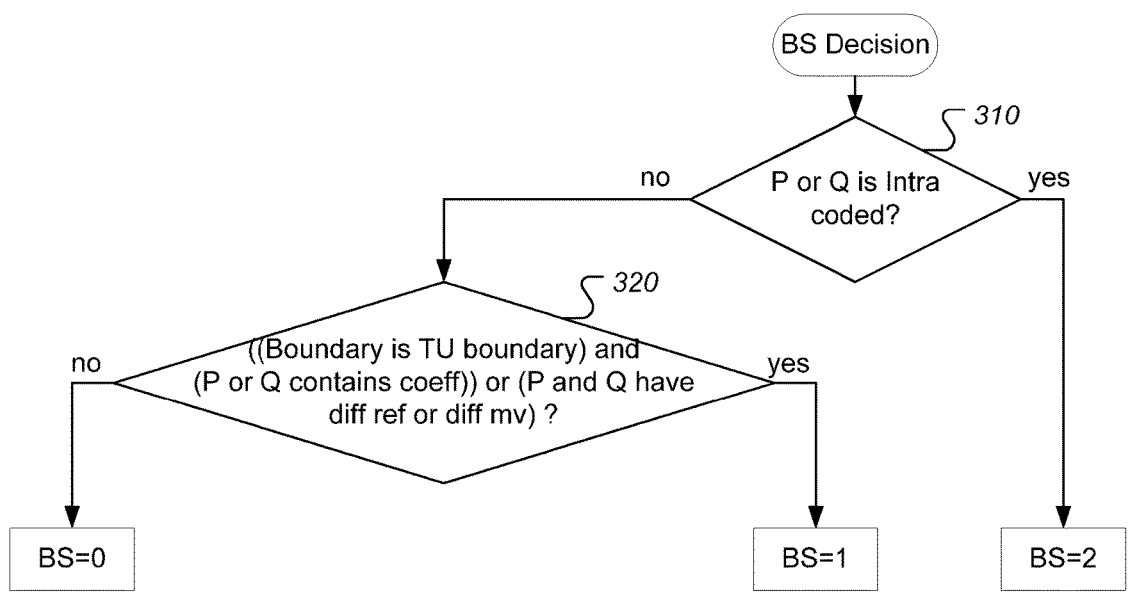
FIG. 3 illustrates an exemplary decision tree for determining boundary strength incorporating an embodiment of the present invention.

FIG. 3 illustrates an exemplary BS decision tree incorporating an embodiment of the present invention. A decision regarding whether block P or block Q is Intra coded is made in step 310. If the test result is "yes" (i.e., affirmative), the boundary strength value is set to 2 (i.e., BS=2). Otherwise it goes to step 320 for further testing. In step 320, the testing is equivalent to the testing of step 230 and step 240 by "or-ing" the test result. Therefore, if "(the block boundary is a TU boundary) and (P or Q contains coefficients)" is true or "P and Q have different reference picture or different motion vector" is true, the boundary strength value is set to 1 (i.e., BS=1). Otherwise BS value is set to 0. Compared to the BS decision in FIG. 2, the embodiment of present invention in FIG. 3 does not check whether the block boundary is a CU boundary. Furthermore, if "(the block boundary is a TU boundary) and (P or Q contains coefficients)" is true, the test associated with "P and Q have different reference pictures or different motion vectors" can be skipped. Therefore, the embodiment of present invention in FIG. 3 reduces system computational load. The number of BS values is reduced from 5 to 3 according to the embodiment in FIG. 3.

The BS decision tree of FIG. 3 is intended to illustrate an example of incorporating an embodiment of the present invention. A person skilled in the art may rearrange the steps or utilize equivalent testing to practice the present invention. In one example, the position test in step 320 may be split into multiple sequential steps to achieve the same goal. In another example, the testing of whether P and Q have different reference pictures or different motion vectors can be performed equivalently by testing whether P and Q have the same reference picture and the same motion vector.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of deblocking of reconstructed video in a video coding system, wherein the deblocking is applied to block boundaries of the reconstructed video, and each block corresponds to a prediction unit (PU) or a transform unit (TU), the method comprising:
    receiving pixel data associated with a block boundary between two blocks;
    determining boundary strength for the block boundary based on information associated with the reconstructed video, wherein the boundary strength only has three values: a first value, a second value, and a third value, and determining the boundary strength comprises:
        determining whether any of the two blocks is Intra coded;
        assigning the boundary strength to the first value if any of the two blocks is Intra coded;
        performing additional decision processing to determine the boundary strength if both of the two blocks are not Intra coded, wherein the additional decision processing comprises first testing and second testing, wherein the boundary strength is assigned the second value if a result associated with the first testing or the second testing is affirmative, and the boundary strength is assigned the third value otherwise, wherein the first testing determines whether the block boundary is a TU boundary and whether any of the two blocks contain at least one coefficient responsive to the block boundary being a TU boundary, and wherein the second testing determines whether the two blocks have different reference pictures or different motion vectors; and
    applying the deblocking to the pixel data associated with the block boundary according to the boundary strength.

2. An apparatus of deblocking of reconstructed video in a video coding system, wherein the deblocking is applied to block boundaries of the reconstructed video, and each block corresponds to a prediction unit (PU) or a transform unit (TU), the apparatus comprising:
    a processor configured to execute executable code, the executable code causing the processor to:
    receive pixel data associated with a block boundary between two blocks;
    determine boundary strength for the block boundary based on information associated with the reconstructed video, wherein the boundary strength only has three values: a first value, a second value, and a third value, and wherein the boundary strength is determined at least in part by:
        determining whether any of the two blocks is Intra coded;
        assigning the boundary strength to the first value if any of the two blocks is Intra coded: and
        performing additional decision processing to determine the boundary strength if both of the two blocks are not Intra coded, wherein the additional decision processing comprises first testing and second testing, wherein the boundary strength is assigned the second value if a result associated with the first testing or the second testing is affirmative, and the boundary strength is assigned the third value otherwise, wherein the first testing determines whether the block boundary is a TU boundary and whether any of the two blocks contain at least one coefficient responsive to the block boundary being a TU boundary, and wherein the second testing determines whether the two blocks have different reference pictures or different motion vectors; and
    apply said deblocking to the pixel data associated with the block boundary according to the boundary strength.

* * * * *